(12) United States Patent  (10) Patent No.: US 7,594,558 B2
Isayama  (45) Date of Patent: Sep. 29, 2009

(54) MOTORCYCLE

(75) Inventor: Hiroyuki Isayama, Samutprakarn (TH)

(73) Assignee: Yamaha Hatsudoki Kabushiki Kaisha, Shizuoka-Ken (JP)

( * ) Notice: Subject to any disclaimer, the term of this patent is extended or adjusted under 35 U.S.C. 154(b) by 409 days.

(21) Appl. No.: 11/459,592

(22) Filed: Jul. 24, 2006

(65) Prior Publication Data
US 2007/0023216 A1 Feb. 1, 2007

(30) Foreign Application Priority Data
Jul. 25, 2005 (JP) ............................. 2005-213967

(51) Int. Cl.
B62K 11/00 (2006.01)
B62K 19/00 (2006.01)
(52) U.S. Cl. ..................... 180/219; 180/220; 280/274
(58) Field of Classification Search ................ 180/219, 180/220, 227, 228; 280/274; 224/413
See application file for complete search history.

(56) References Cited
U.S. PATENT DOCUMENTS
5,044,646 A * 9/1991 Iiga et al. .................... 180/219

6,170,593 B1 * 1/2001 Hatanaka ..................... 180/219
7,353,903 B2 * 4/2008 Miyabe et al. ............... 180/219
7,377,552 B2 * 5/2008 Miyabe ....................... 280/835
2005/0155804 A1 * 7/2005 Kamemizu et al. ........... 180/219
2006/0090944 A1 * 5/2006 Ishida et al. ................. 180/219
2006/0124372 A1 * 6/2006 Ishida et al. ................. 180/228

FOREIGN PATENT DOCUMENTS
JP 3585920 8/2004

* cited by examiner

Primary Examiner—Lesley D Morris
Assistant Examiner—Marc A Scharich
(74) Attorney, Agent, or Firm—Hogan & Hartson LLP

(57) ABSTRACT

A motorcycle with an increased rigidity portion for supporting a storage box. A body frame includes a main frame extending rearward and obliquely downward from a head pipe. Left and right seat rails are connected to the rear portion of the main frame and extend rearward and obliquely upward. Left and right backstays extend between and are connected to the left and right seat rails and the rear end of the main frame. A storage box is disposed such that its bottom is positioned above a connection part of the main frame and the backstays, and the storage box has front and rear attachment parts secured to the seat rails. The front and rear attachment parts are separately disposed, respectively, forward and rearward of a vertical line that passes through the connection part.

17 Claims, 8 Drawing Sheets

US 7,594,558 B2

MOTORCYCLE

RELATED APPLICATIONS

This application claims the benefit of priority under 35 USC 119 of Japanese patent application no. 2005-213967, filed on Jul. 25, 2005, which application is hereby incorporated by reference in its entirety.

BACKGROUND OF THE INVENTION

1. Field of the Invention

The present invention relates to a motorcycle having a body frame and a storage box attached to the body frame.

2. Description of Related Art

Some motorcycles have a storage box to hold a helmet, small articles or the like. In JP-B-3585920, for example, a motorcycle has a main frame, and a pair of left and right rear frames having front ends connected to the rear end of the main frame and extending rearward and upward. A storage box is disposed between the front portions of the left and right rear frames; and a bottom wall and a vertical central portion of a rear wall of the storage box are secured to the rear frames with bolts.

Such a conventional structure, having a rear end of a main frame connected to front ends of rear frames that extend upward and rearward, has less rigidity against a vertical load applied to rear portions of the rear frames, and raises a concern about insufficient rigidity for supporting the storage box.

SUMMARY OF THE INVENTION

The present invention addresses this issue of the prior art and provides a motorcycle with increased rigidity for supporting a storage box.

The present invention is directed to a motorcycle having a body frame and a storage box attached to the body frame. The body frame includes a main frame extending rearward and obliquely downward from a head pipe. A pair of left and right seat rails are connected to a middle part of the main frame and extend rearward and obliquely upward. A pair of left and right backstays extend between and connect the left and right seat rails and the rear end of the main frame. The storage box is disposed such that its bottom is positioned above a connection part of the main frame and the backstays. The storage box has front and rear attachment parts secured to the seat rails and separately disposed, respectively, forward and rearward of a vertical line that passes through the connection part.

In a motorcycle according to the present invention, the main frame, the seat rails and the backstays define a high rigidity portion in a generally triangular shape. The high rigidity portion supports a vertical load applied to the seat rails, providing increased rigidity for support of the seat rails.

Configuring the storage box with its bottom positioned above a connection part of the main frame and the backstays, and with attachment parts to the seat rails that are separately disposed, respectively, forward and backward of a vertical line that passes through the connection part, allows support of the storage box by the high rigidity portion, thereby increasing the rigidity for supporting the storage box.

Other features and advantages of the invention will be apparent from the following detailed description, taken in conjunction with the accompanying drawings which illustrate, by way of example, various features of embodiments of the invention.

DETAILED DESCRIPTION OF THE INVENTION

Figure 1:
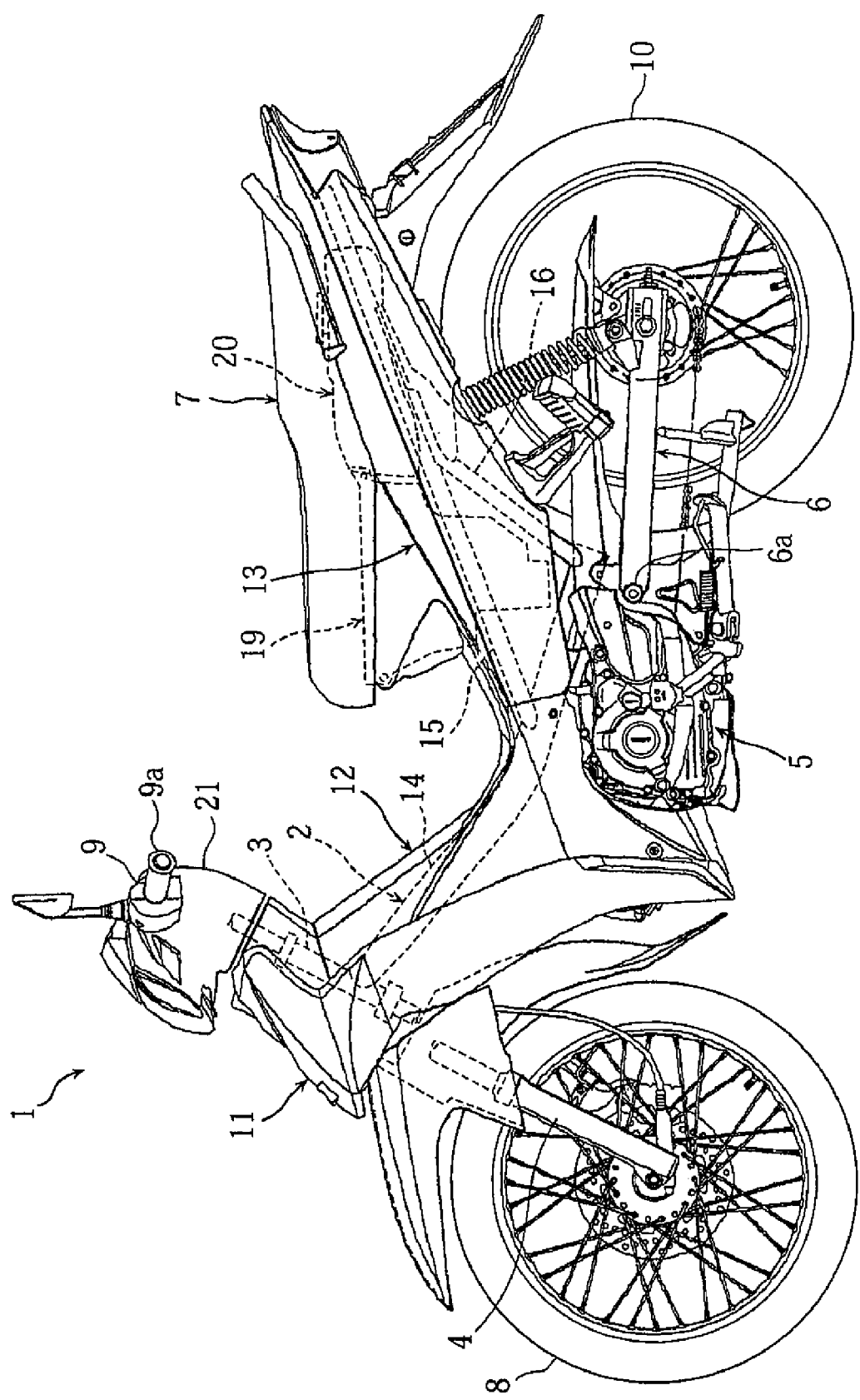
FIG. 1 is a side view of a motorcycle according to an embodiment of the present invention.

An embodiment of the present invention is described hereinafter with reference to the attached drawings.

FIGS. 1-8 are explanatory views of a motorcycle in accordance with an embodiment of the present invention. In the following description and claims, the terms "right," "left," "front" and "rear" mean right, left, front and rear sides from the perspective of a rider seated in the seat.

In the drawings, reference numeral 1 denotes a motorcycle. The motorcycle 1 includes an underbone type body frame 2; a head pipe 3 fixed to the front end of the body frame 2; a front fork 4 pivotally supported with the head pipe 3 for left-and-right steering movement; an engine unit 5 suspended from and supported by the central portion of the body frame 2; a rear arm 6 pivotally supported therewith for up-and-down pivotal movement; and a seat 7 for two persons mounted on the upper rear portion of the body frame 2.

A front wheel 8 is rotatably supported at the lower end of the front fork 4. Steering handlebars 9 are fixed at the upper end of the front fork 4. A rear wheel 10 is rotatably supported at the rear end of the rear arm 6.

The front side of the head pipe 3 of the body frame 2 is covered with a front cover 11, and the rear side with a leg shield 12. A portion of the body frame 2 below the periphery of the seat 7 is covered with a side cover 13. The periphery of the steering handlebars 9 is covered with a handlebar cover 21, from which operating parts such as left and right grips 9a, 9a are exposed outside.

The body frame 2 includes a main frame 14 extending generally linearly and obliquely downward from the head pipe 3 towards the rear of motorcycle 1; a pair of left and right seat rails 15, 15 connected to a middle part of the main frame 14 and extending linearly and obliquely upward towards the rear of motorcycle 1; and a pair of left and right backstays 16, 16 extending between and connected to longitudinally generally central parts of the left and right seat rails 15, 15 and the rear end of the main frame 14.

As viewed in the transverse direction of the vehicle, the rear portion of the main frame 14, the front half portions of the seat rails 15 and the backstays 16 define a high rigidity portion 2a in the shape of a generally inverted triangle.

A longitudinal central part of the main frame 14 is connected to an engine bracket 14a for suspension and support of an upper part of the engine unit 5. The rear end of the main frame 14 is connected to a rear arm bracket 14b for suspension and support of a rear part of the engine unit 5 and for support of the front end of the rear arm 6 via a pivot shaft 6a for up-and-down pivotal movement.

Figure 2:
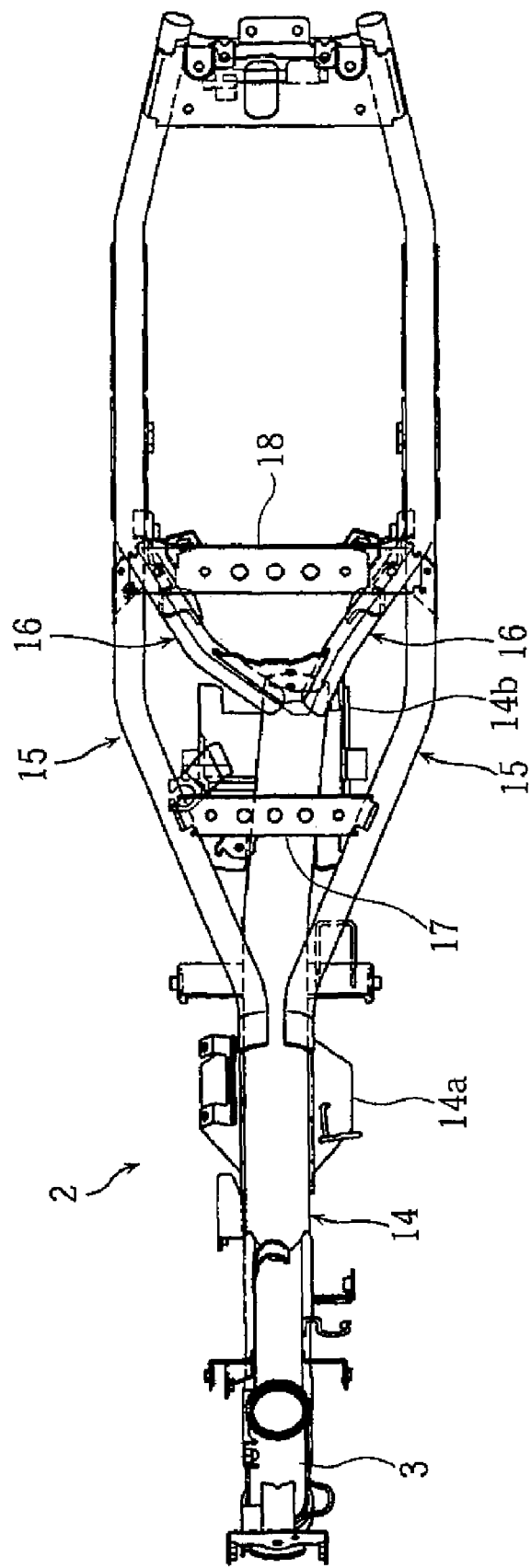
FIG. 2 is a plan view of a body frame of the motorcycle.

The left and right seat rails 15, 15 flare transversely outward from the main frame 14 and extend rearward, and then extend generally linearly rearward, as viewed in the plan view (FIG. 2). Front and rear cross members 17, 18 are in a downward U shape and extend transversely of the vehicle. The front and rear cross members 17, 18 extend between and are coupled to, respectively, the front end portions of the left and right seat rails 15, 15 and central parts thereof.

A storage box 19 is disposed below the seat 7 and between the left and right seat rails 15, 15. A fuel tank 20 is disposed behind the storage box 19 to be aligned longitudinally of the vehicle. A top opening 19d of the storage box 19 and a fuel inlet 20a of the fuel tank 20 are covered with the seat 7 so as to be opened and closed by seat 7.

The storage box 19 includes a generally bowl-shaped box body 19a having the top opening 19d; a generally rectangular box-shaped battery storage section 19b protruding downwardly from the bottom 19c of the box body 19a; and a component storage section 19e protruding rearwardly from the back of the battery storage section 19b. The battery storage section 19b and the component storage section 19e are formed inside the bottom 19c in a stepped-down manner.

The box body 19a has a capacity to hold a helmet, for example. In the battery storage section 19b, a battery 23 is stored. In the component storage section 19e, a flasher relay 24 and a CDI unit 25 are stored and aligned on the left and right sides, respectively, of storage section 19e. A fuse assembly 26 is attached to the rear of the flasher relay 24. A right side part of the battery storage section 19b has an insertion passage 19f that is open at a bottom wall of the battery storage section 19b. A harness 27 or the like is routed through the insertion passage 19f (see FIG. 5).

Figure 7:
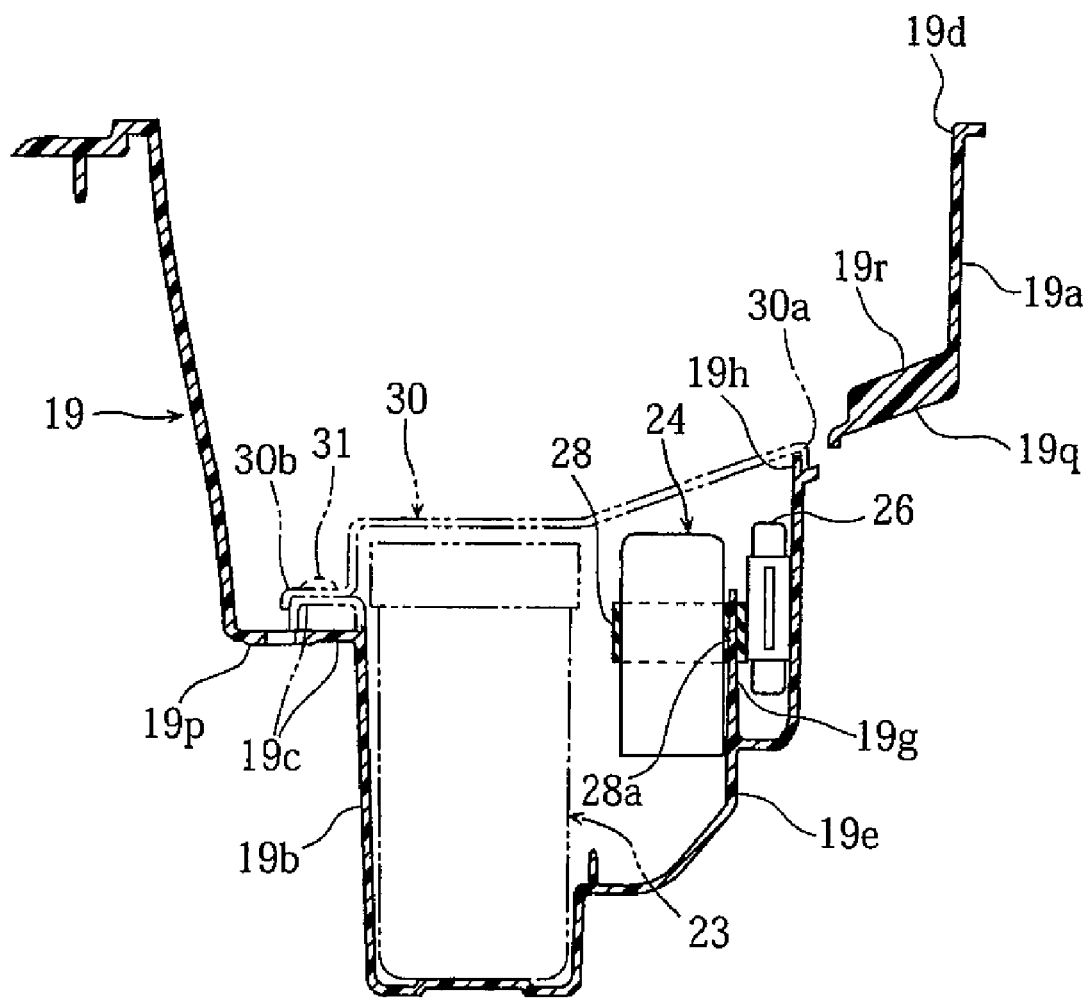
FIG. 7 is a sectional view of the storage box taken along line VII-VII of FIG. 4.
Figure 8:
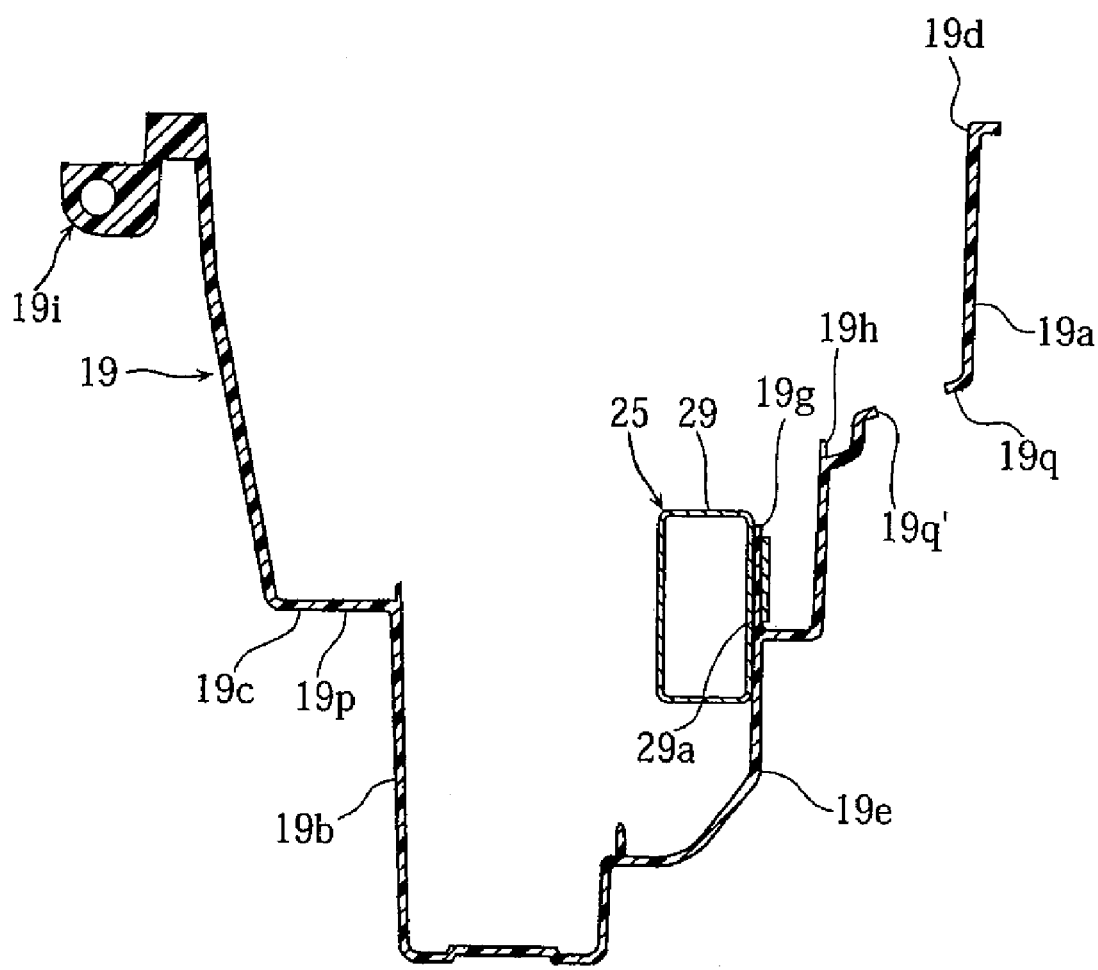
FIG. 8 is a sectional view of the storage box taken along line VIII-VIII of FIG. 4.

The flasher relay 24 and the CDI unit 25 are respectively held with rubber retention members 28, 29 having engagement passages 28a, 29a, through which support lugs 19g, 19g formed to be raised on the component storage section 19e are inserted to hold the flasher relay 24 and the CDI unit 25 in position (see FIGS. 7 and 8).

A top opening of the battery storage section 19b and the component storage section 19e is closed with a lid member 30. The lid member 30 defines a bottom wall of the box body 19a.

Figure 5:
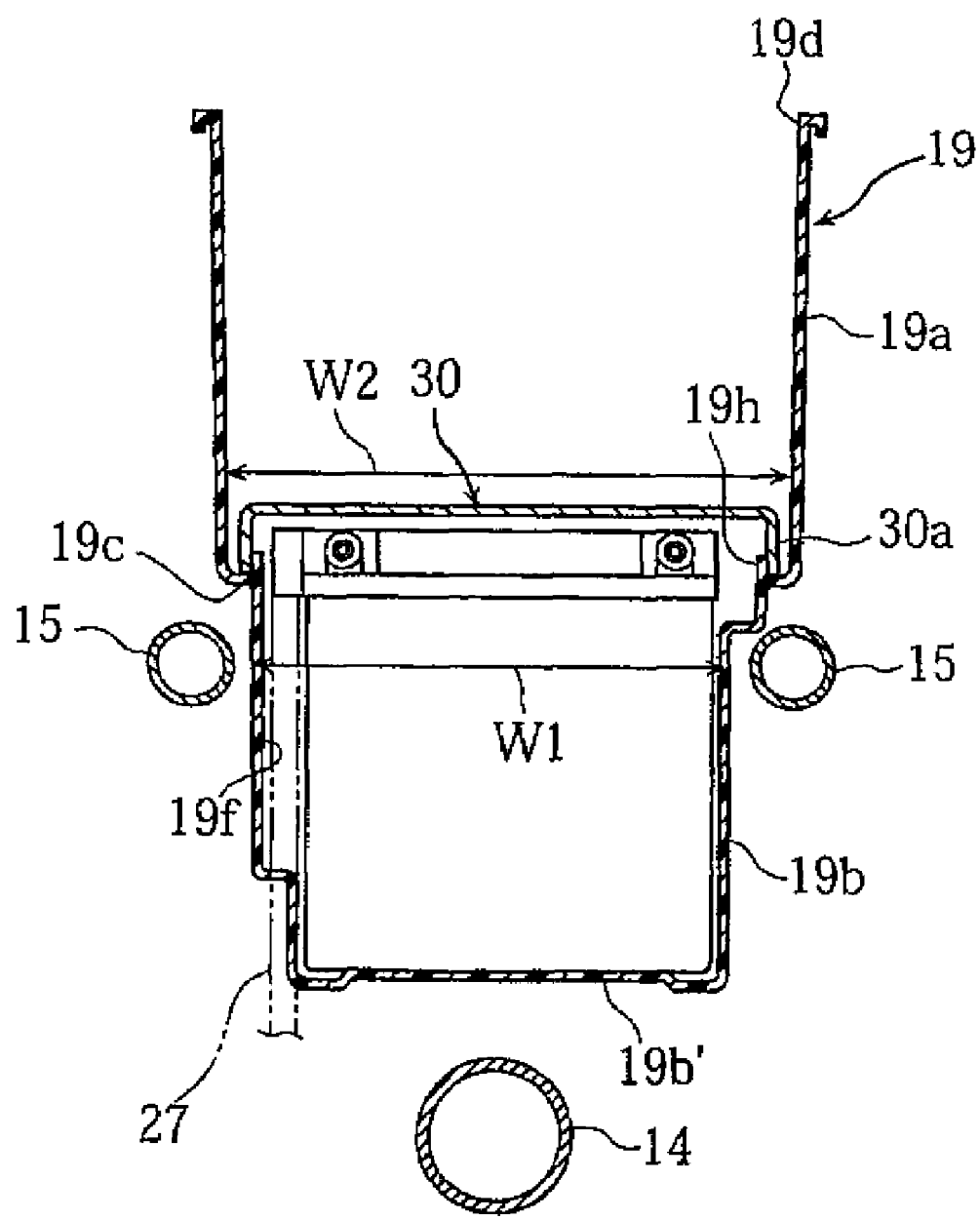
FIG. 5 is a sectional view of the storage box taken along line V-V of FIG. 3.

The lid member 30 is removably secured, such that a flange portion 30a formed on the peripheral edge of the lid member 30 is engaged with a rib 19h formed to be raised on the peripheral edge of the opening of the battery storage section 19b and the component storage section 19e, and a front flange part 30b of the flange portion 30a is fastened to the bottom 19c with a bolt 31 (see FIGS. 5 and 7). This prevents incoming water into the box body 19a from flowing into the battery storage section 19b and the component storage section 19e.

The battery storage section 19b has a maximum transverse width w1 that is smaller than a minimum transverse width w2 of the box body 19a (FIG. 5). The seat rails 15 pass the vicinity of the left and right sides of a portion of the battery storage section 19b that has the maximum transverse width w1.

Figure 3:
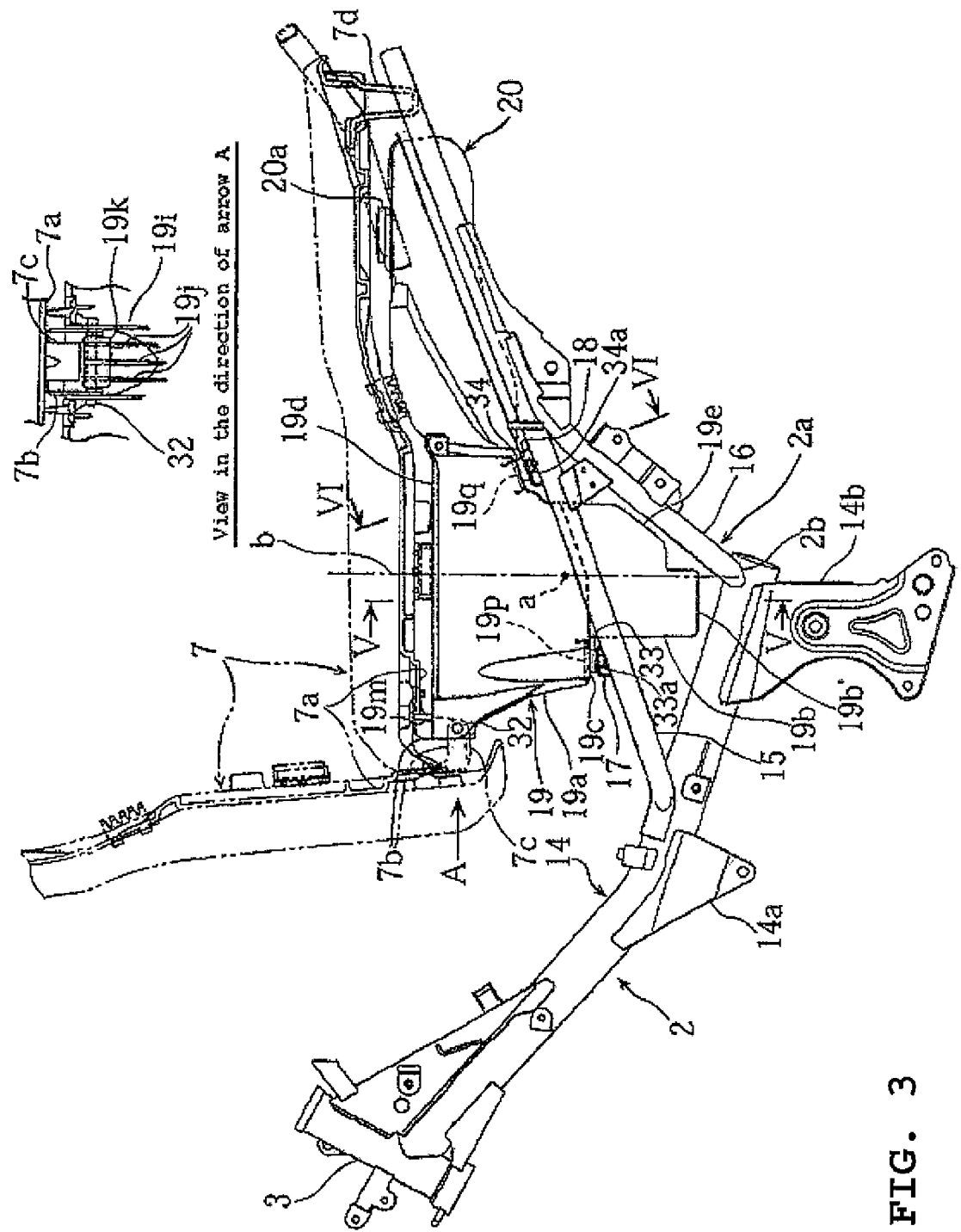
FIG. 3 is a side view of the body frame.
Figure 4:
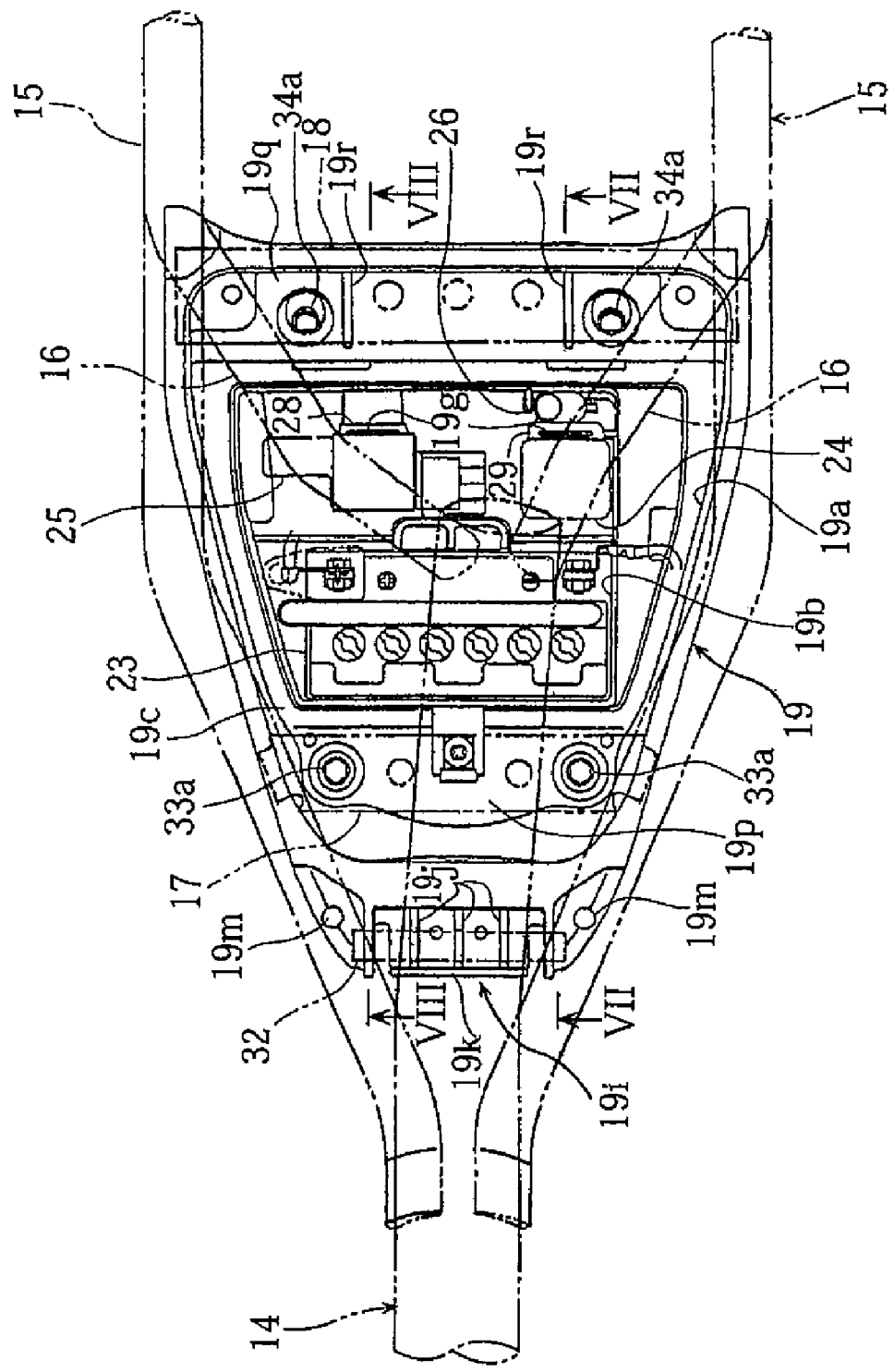
FIG. 4 is a plan view of a storage box disposed on the body frame.

A front wall of the box body 19a has a hinge part 19i for pivotal support of the seat 7. The hinge part 19i includes a plurality of vertical ribs 19j extending vertically and spaced apart from each other transversely with a certain distance therebetween, and a transverse rib 19k coupled to the vertical ribs 19j to couple the vertical ribs 19j together (FIG. 3).

The front end of a bottom plate 7a of the seat 7 is fixed to a downward U-shaped hinge arm 7b. The hinge arm 7b is pivotally supported with a hinge pin 32 that is inserted through and attached to the vertical ribs 19j. The hinge arm 7b is formed with a stopper 7c for holding the seat 7 in its open position when coming in contact with the vertical ribs 19j (see FIG. 3 and a view in the direction of the arrow A in FIG. 3).

The seat 7 is thereby supported about the hinge pin 32 for opening and closing movement between its closed position where the seat 7 covers the top side of the storage box 19 and the fuel tank 20, and its open position where the seat 7 is generally in an upright position to allow access to the storage box 19 and the fuel tank 20. The rear end of the bottom plate 7a of the seat 7 is connected to a lock arm 7d for locking the seat 7 to the seat rail 15. Reference numerals 19m, 19m denote projections for holding the seat 7 in its closed position when coming in contact with the bottom plate 7a of the seat 7.

The bottom 19c of the box body 19a has a front attachment part 19p positioned at the front end and extending generally horizontally, and a rear attachment part 19q positioned at the rear end and inclined obliquely upward along the seat rail 15.

The front and rear attachment parts 19p, 19q are positioned at the vertically generally central portion of the entire storage box 19. More specifically, the front attachment part 19p and the rear attachment part 19q are disposed respectively below and above a vertical center "a" of the storage box 19 (FIG. 3).

Figure 6:
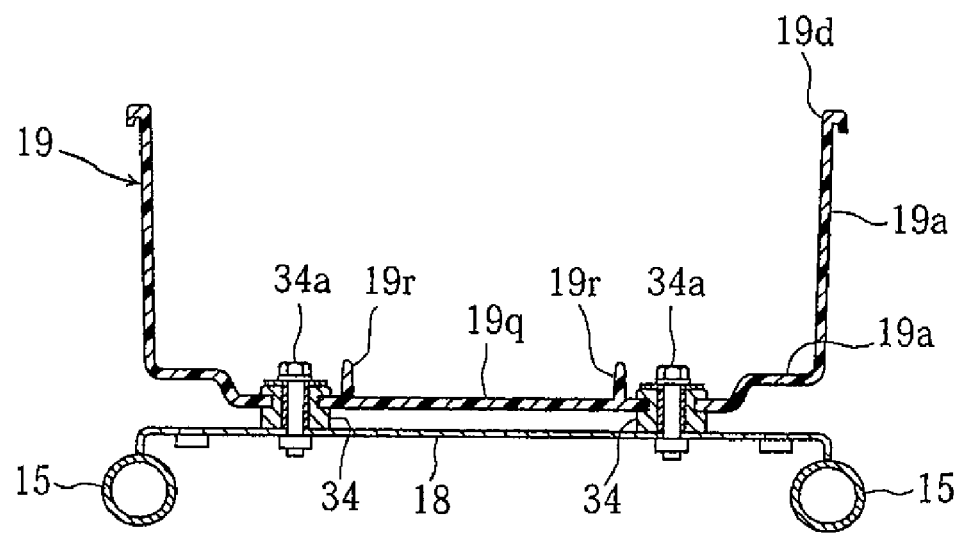
FIG. 6 is a sectional view of the storage box taken along line VI-VI of FIG. 3.

The front attachment part 19p is fixed to the front cross member 17 via a pair of left and right rubber bushes 33, 33 with bolts 33a, 33a. The rear attachment part 19q is fixed to the rear cross member 18 via a pair of left and right rubber bushes 34, 34 with bolts 34a, 34a. The front and rear attachment parts 19p, 19q are formed with ribs 19r slightly higher than the bolts 33a, 34a, preventing stored objects from touching the bolts 33a, 34a (FIG. 6).

The upper face of the rear cross member 18 is stamped with a vehicle identification number (not shown). The rear attachment part 19q at a part that faces the vehicle identification number has a slot 19q' extending therethrough (see FIG. 8). Opening the seat 7 enables the user to visually identify the vehicle identification number through the slot 19q.

As shown in FIG. 3, the storage box 19 is disposed in the space defined by the high rigidity portion 2a, which is defined by the rear portion of the main frame 14, the left and right seat rails 15, 15 and the left and right backstays 16, 16.

Further, the storage box 19 is disposed such that a bottom wall 19b' of the battery storage section 19b is positioned above and adjacent to a connection part 2b of the main frame 14 and the backstays 16.

Further, the storage box 19 is disposed such that the battery storage section 19b and the component storage section 19e are positioned in the space defined by the high rigidity portion 2a, below the seat rails 15, and the box body 19a is positioned above the seat rails 15.

The front and rear attachment parts 19p, 19q of the storage box 19 are separately disposed, respectively, forward and rearward of a vertical line "b" that passes through the connection part 2b. The storage box 19 is disposed such that the battery storage section 19b is positioned forward of the vertical line "b" and the component storage section 19e rearward thereof According to this embodiment, the body frame 2 includes the main frame 14 extending from the head pipe 3 obliquely downward and rearward; the left and right seat rails 15, 15 connected to the rear portion of the main frame 14 and extending linearly obliquely upward and rearward; and the left and right backstays 16, 16 extending between and connected to the left and right seat rails 15 and the rear end of the main frame 14. The rear portion of the main frame 14, the front half portions of the seat rails 15 and the backstays 16 define the high rigidity portion 2a in the shape of an inverted triangle. The high rigidity portion 2a carries a vertical load applied to the rear portions of the seat rails 15, providing increased rigidity for support of the seat rails 15.

The storage box 19 is disposed such that the bottom 19b' of the storage box 19 is positioned above the connection part 2b of the main frame 14 and the backstays 16, and the front and rear attachment parts 19p, 19q, fixed to the front and rear cross members 17, 18, are separately disposed, respectively, forward and backward of the vertical line "b" that passes through the connection part 2b. This allows support of the storage box 19 by the high rigidity portion 2b, thereby securing enough storage capacity of the storage box 19 and increasing rigidity for supporting it.

In this embodiment, the storage box 19 has the box body 19a having the top opening 19d, and the battery storage section 19b protruding downwardly from the bottom 19c of the box body 19a. The battery storage section 19b has the maximum width w1 that is smaller than the minimum width w2 of the box body 19a, and the seat rails 15 are disposed on the left and right sides of the battery storage section 19b. This allows separate arrangement of the box body 19a to hold a helmet or the like of a large width and the battery storage section 19b to hold the battery 23 of a small width, above and below the seat rail 15, respectively. It is thus possible to reduce the vehicle width, while securing necessary box capacity.

In this embodiment, the front and rear attachment parts 19p, 19q of the storage box 19 are provided at the vertically generally central portion of the storage box 19. This provides increased strength for mounting the storage box 19 to the vehicle body, compared to the case where the mounting parts are provided at the lower end of the box.

Further, the front end of the storage box 19 has the hinge part 19i for pivotal support of the seat 7, allowing support of the seat 7 in the vicinity of the front attachment part 19p that has higher strength. No pivotal movement of the seat 7 about the hinge pin 32, therefore, causes deflection of the storage box 19, ensuring reliable opening and closing operations of the seat 7 over a long life.

In this embodiment, the rear cross member 18 for coupling the left and right seat rails 15 is stamped with the vehicle identification number. The rear attachment part 19q of the storage box 19 has the slot 19q' to allow visual identification of the vehicle identification number by the user. The user thus can easily identity the vehicle identification number by opening the seat 7. The rear attachment part 19q may be provided with a lid for opening and closing the slot 19q'.

The particular embodiments of the invention described in this document should be considered illustrative, rather than restrictive. Modification to the described embodiments may be made without departing from the spirit of the invention as defined by the following claims.

The invention claimed is:

1. A motorcycle comprising:
a body frame comprising: a main frame extending rearward and obliquely downward from a head pipe; a pair of left and right seat rails connected to a middle part of the main frame and extending rearward and obliquely upward; and a pair of left and right backstays extending between and connected to the left and right seat rails and a rear end of the main frame; and
a storage box attached to the body frame and comprising: a bottom positioned above a connection part of the main frame and the backstays; and front and rear attachment parts secured to the seat rails, the attachment parts being separately disposed, respectively, forward and rearward of a vertical line that passes through the connection part, wherein
the storage box has a box body having an upward opening, and a battery storage section protruding downwardly from a bottom of the box body, the battery storage section having a transverse width that is smaller than a transverse width of the box body, and the seat rails are disposed on left and right sides of the battery storage section.

2. The motorcycle according to claim 1, wherein the front and rear attachment parts of the storage box are provided near a vertical center of the storage box.

3. The motorcycle according to claim 2, wherein the storage box is made of resin material, and a front end of the storage box has a hinge part for pivotal support of a seat between a closed position where the upward opening is closed and an open position where the upward opening is open.

4. The motorcycle according to claim 2, wherein the front attachment part is disposed below the vertical center of the storage box and the rear attachment part is disposed above the vertical center of the storage box.

5. The motorcycle according to claim 1, wherein the rear end of the main frame, front half portions of the seat rails and the backstays define a high rigidity portion in a general shape of an inverted triangle.

6. The motorcycle according to claim 5, wherein the high rigidity portion carries a vertical load applied to rear portions of the seat rails, thereby providing increased rigidity for support of the seat rails.

7. The motorcycle according to claim 5, wherein the battery storage section is positioned in a space defined by the high rigidity portion below the seat rails, and the box body is positioned above the seat rails.

8. The motorcycle according to claim 1, wherein the storage box further comprises a component storage section protruding rearwardly from the battery storage section.

9. The motorcycle according to claim 8 and further comprising a flasher relay in a left side of the component storage section and aligned with a CDI unit on a right side of the component storage section.

10. A motorcycle comprising:
a body frame comprising: a main frame extending rearward and obliquely downward from a head pipe; a pair of left and right seat rails connected to a middle part of the main frame and extending rearward and obliquely upward; and a pair of left and right backstays extending between and connected to the left and right seat rails and a rear end of the main frame; and
a storage box attached to the body frame and comprising: a bottom positioned above a connection part of the main frame and the backstays; and front and rear attachment parts secured to the seat rails, the attachment parts being separately disposed, respectively, forward and rearward of a vertical line that passes through the connection part, wherein
the left and right seat rails are coupled by cross members extending transversely of the motorcycle, wherein at least one of the cross members has an upper face, the attachment parts of the storage box are attached to the cross members, and at least one of the attachment parts is provided with a slot to allow visual identification of the upper face from outside.

11. A motorcycle comprising:
a body frame comprising: a main frame extending rearward and obliquely downward from a head pipe; a pair of left and right seat rails connected to a middle part of the main frame and extending rearward and obliquely upward;

and a pair of left and right backstays extending between and connected to the left and right seat rails and a rear end of the main frame; and a storage box attached to the body frame and comprising: a bottom positioned above a connection part of the main frame and the backstays; and front and rear attachment parts secured to the seat rails, the attachment parts being separately disposed, respectively, forward and rearward of a vertical line that passes through the connection part, wherein the front attachment part is secured to the seat rails by a front cross member extending between and coupled to front end portions of the seat rails, and the rear attachment part is secured to the seat rails by a rear cross member extending between and coupled to central parts of the seat rails.

12. A motorcycle comprising:

a body frame comprising: a main frame extending rearward and obliquely downward from a head pipe; a pair of left and right seat rails connected to a middle part of the main frame and extending rearward and obliquely upward; and a pair of left and right backstays extending between and connected to the left and right seat rails and a rear end of the main frame; and a storage box attached to the body frame and comprising: a bottom positioned above a connection part of the main frame and the backstays; and front and rear attachment parts secured to the seat rails, the attachment parts being separately disposed, respectively, forward and rearward of a vertical line that passes through the connection part, wherein the front and rear attachment parts comprise bolts and are formed with ribs slightly higher than the bolts to prevent stored objects from touching the bolts.

13. A motorcycle comprising:

a high rigidity frame portion in a shape of an inverted triangle that is defined by a rear end of a main frame that extends rearward and obliquely downward from a head pipe; front half portions of seat rails connected to a middle part of the main frame and extending rearward and obliquely upward; and backstays extending between the seat rails and the rear end of the main frame; and a storage box attached to the high rigidity frame portion by at least two attachment parts provided near a vertical center of the storage box, wherein a bottom of the storage box is positioned above a connection part of the main frame and the backstays, and the at least two attachment parts comprise a front attachment part that is forward of a vertical line passing through the connection part and a rear attachment part that is rearward of the vertical line.

14. The motorcycle according to claim 13, wherein the front attachment part is disposed below the vertical center of the storage box and the rear attachment part is disposed above the vertical center.

15. A motorcycle comprising:

a high rigidity frame portion in a shape of an inverted triangle that is defined by a rear end of a main frame that extends rearward and obliquely downward from a head pipe; front half portions of seat rails connected to a middle part of the main frame and extending rearward and obliquely upward; and backstays extending between the seat rails and the rear end of the main frame; and a storage box attached to the high rigidity frame portion by at least two attachment parts provided near a vertical center of the storage box, wherein the storage box comprises a battery storage section that is positioned within the high rigidity frame portion below the seat rails and a box body that is positioned above the seat rails.

16. The motorcycle according to claim 15, wherein the battery storage section has a transverse width that is smaller than a transverse width of the box body.

17. The motorcycle according to claim 15, wherein the storage box further comprises a component storage section positioned within the high rigidity frame portion below the seat rails and protruding rearwardly from the battery storage section.

* * * * *

UNITED STATES PATENT AND TRADEMARK OFFICE
CERTIFICATE OF CORRECTION

PATENT NO.       : 7,594,558 B2  
APPLICATION NO.  : 11/459592  
DATED            : September 29, 2009  
INVENTOR(S)      : Hiroyuki Isayama Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 476 days.

Signed and Sealed this

Twenty-eighth Day of September, 2010

David J. Kappos  
*Director of the United States Patent and Trademark Office*